United States Patent
Cunningham, II et al.

(10) Patent No.: US 6,170,898 B1
(45) Date of Patent: Jan. 9, 2001

(54) PIVOT ASSEMBLY FOR A VEHICLE SEAT

(75) Inventors: Spencer D. Cunningham, II, Southfield; Michael D. Via, Ortonville; George Aboud, Northville, all of MI (US)

(73) Assignee: Lear Corporation, Southfield, MI (US)

(*) Notice: Under 35 U.S.C. 154(b), the term of this patent shall be extended for 0 days.

(21) Appl. No.: 09/258,457

(22) Filed: Feb. 26, 1999

(51) Int. Cl.$^7$ .................................................. B60N 2/42
(52) U.S. Cl. ...................... 296/65.16; 296/65.13; 296/68.1; 297/362.14; 297/452.18
(58) Field of Search ............... 296/65.01, 65.09, 296/65.13, 65.16, 65.17, 68.1; 297/361.1, 362.11, 362.14, 440.21, 452.18, 452.2

(56) References Cited

U.S. PATENT DOCUMENTS

| | | |
|---|---|---|
| 5,460,429 | 10/1995 | Whalen . |
| 5,476,307 | 12/1995 | Whalen . |
| 5,590,932 | 1/1997 | Olivieri . |
| 5,622,410 | 4/1997 | Robinson . |
| 5,660,440 | 8/1997 | Pejathaya . |
| 5,681,079 | 10/1997 | Robinson . |
| 5,707,112 | 1/1998 | Zinn . |
| 5,711,577 | 1/1998 | Whalen . |
| 5,895,090 | * 4/2000 | Farquhar et al. .................. 297/216.1 |
| 6,045,186 | * 4/2000 | Butt et al. ............................ 297/296 |

* cited by examiner

Primary Examiner—Joseph D. Pape
(74) Attorney, Agent, or Firm—Brooks & Kushman P.C.

(57) ABSTRACT

A vehicle seat for use in a vehicle having a floor includes a safety belt system mounted to and carried by the vehicle seat, a lower seat structure mounted to the floor, a seatback frame, and a pivot assembly connecting the seatback frame to the lower seat structure such that the seatback frame may pivot with respect to the lower seat structure. The pivot assembly includes a bracket connected to the lower seat structure, and a pivotable connector member connected to the seatback frame and pivotally connected to the bracket. The bracket has first and second side portions that define an open bottom, and the first and second side portions are connected to the lower seat structure.

10 Claims, 5 Drawing Sheets

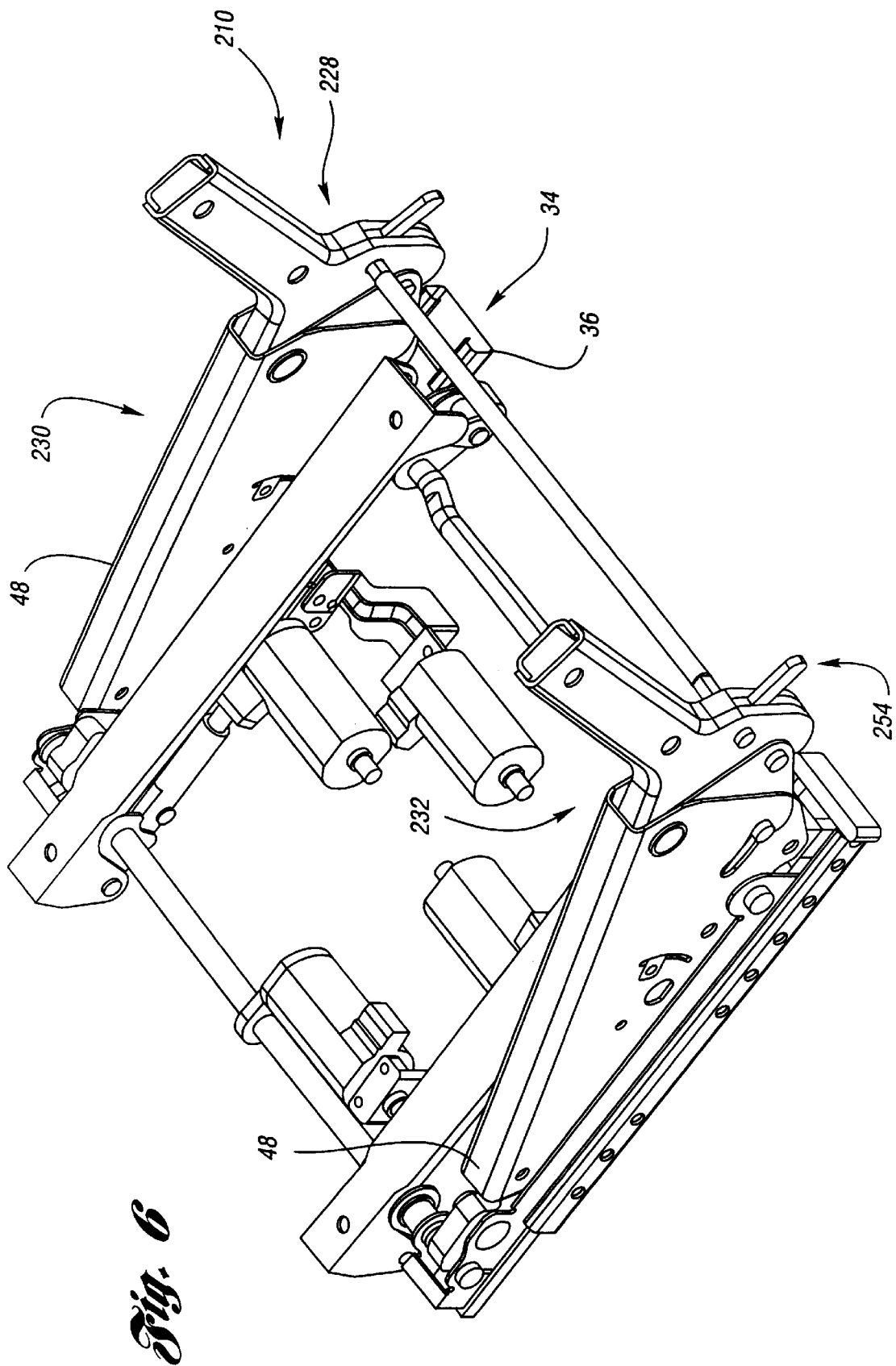

PIVOT ASSEMBLY FOR A VEHICLE SEAT

TECHNICAL FIELD

The invention relates to an improved recliner or pivot assembly for a vehicle seat of the type that carries a safety belt system and includes a seatback pivotally connected to a lower seat structure.

BACKGROUND ART

Most motor vehicles are equipped with restraint systems including a retractable safety belt system. Typically, the safety belt system is attached directly to the vehicle structure, such as a floor pan and/or B-pillar of the vehicle. It is also known to mount a safety belt system directly to a seat assembly. In such an arrangement, the structure of the seat assembly must be of sufficient strength to accommodate potentially significant loads that may be generated as a result of impact, severe braking, or the like.

U.S. Pat. No. 5,711,577, for example, shows a vehicle seat having a safety belt system mounted thereto, and includes a seatback pivotally connected to a lower seat structure by a pivot assembly. The pivot assembly includes a housing and a pivot arm pivotally attached to the housing. The housing includes inner and outer plate members, and the inner plate has a downwardly extending lower edge that is attached directly to a mounting flange of the outer plate member. The lower edge and the mounting flange are also jointly attached to the lower seat structure.

DISCLOSURE OF INVENTION

The present invention provides a vehicle seat of the "all belts to seat" type having a safety belt system mounted thereto, wherein all belt loads are carried by the seat. The seat includes an improved pivot assembly that permits a seatback of the seat to pivot with respect to a seat cushion, wherein the pivot assembly exhibits significantly greater strength compared with prior vehicle seats.

Accordingly, it is an object of the invention to provide a vehicle seat including an "all belts to seat" safety belt system mounted thereto, and an improved pivot assembly having a bracket and a connector member pivotally connected to the bracket.

Under the invention, a vehicle seat for use in a vehicle having a floor includes a safety belt system mounted to and carried by the vehicle seat, a lower seat structure mounted to the floor, a seatback frame, and a pivot assembly connecting the seatback frame to the lower seat structure such that the seatback frame may pivot with respect to the lower seat structure. The pivot assembly includes a bracket connected to the lower seat structure, and a pivotable connector member connected to the seatback frame and pivotally connected to the bracket. The bracket has first and second substantially parallel side portions that define an open bottom therebetween, and the first and second side portions are connected to the lower seat structure.

According to a feature of the invention, the connector member has a channel, and the pivot assembly further includes an insert disposed within the channel for strengthening the connector member.

According to another feature of the invention, the bracket cooperates with the lower seat structure to define a support structure having a generally rectangular-shaped cross-section along a substantial portion of the support structure.

These and other objects, features and advantages of the invention are readily apparent from the following detailed description for the best modes for carrying out the invention when taken in conjunction with the accompanying drawings.

BRIEF DESCRIPTION OF DRAWINGS

FIG. 5 is a cross-sectional view of the pivot arrangement and lower seat structure taken along line 5—5 of FIG. 3;

FIG. 6 is a perspective view of a second embodiment of the driver seat including a pivot arrangement and lower seat structure.

BEST MODES FOR CARRYING OUT THE INVENTION

The invention is directed to an improved recliner or pivot assembly for a vehicle seat of the type that has a safety belt system mounted directly thereto, such that the vehicle seat carries all loads applied to the safety belt system. The exemplary seating arrangement shown throughout the drawings is illustrated to be specifically adapted for application in a front seating area of a motor vehicle as front driver and passenger seats assemblies. However, it is to be understood that the teachings of the invention are not limited to the particular vehicle seating arrangement shown. That is, the illustrated application is merely an exemplary representation of the general type of environment into which the invention may be incorporated.

Figure 1:
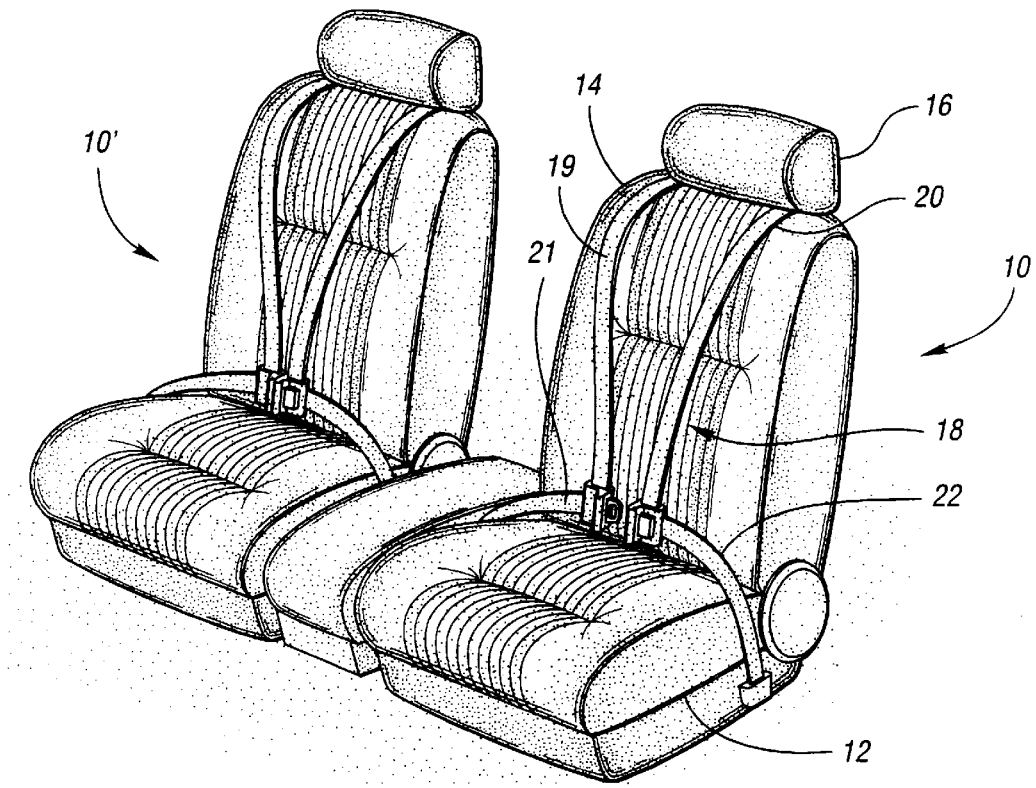
FIG. 1 is a perspective view of a front seating area of a motor vehicle, and showing a driver seat according to the invention.

FIG. 1 shows a portion of a front seating area of a motor vehicle including a driver seat 10 and a passenger seat 10', wherein the seats 10 and 10' are independently adjustable. It is to be understood that the driver seat 10 and the passenger seat 10' are functionally identical, and further that the construction of the passenger seat 10' is a mirror image to that of the driver seat 10. Thus, while the remainder of this detailed description will focus primarily on the construction and operation of the driver seat 10, a thorough understanding of the passenger seat 10' will be apparent therefrom.

The seat 10 includes a seat cushion 12, a padded seatback 14, and a headrest 16 for supporting a vehicle occupant (not shown). When in a standard operating position as illustrated in FIG. 1, seatback 14 extends upwardly at the rear of seat cushion 12, and is angled slightly rearwardly. As will be discussed below in greater detail, seatback 14 is pivotally adjustable to multiple angular positions relative to the seat cushion 12.

The seat 10 further includes a safety belt system 18 mounted to and carried by seat 10. The safety belt system 18 includes first and second retractable torso sections 19 and 20, respectively, and first and second retractable lap sections 21 and 22, respectively, for restraining the vehicle occupant adjacent the seat cushion 12 and seatback 14 when the vehicle is subjected to severe deceleration forces due to, for example, severe braking or a vehicle collision. The safety belt system 18 shown in FIG. 1 is referred to as a 4-point belt system because it is secured to the seat assembly 10 at four positions. Alternatively, the seat 10 may be provided with a 3-point belt system, or safety belt system that is secured to the seat 10 at three positions.

Figure 2:
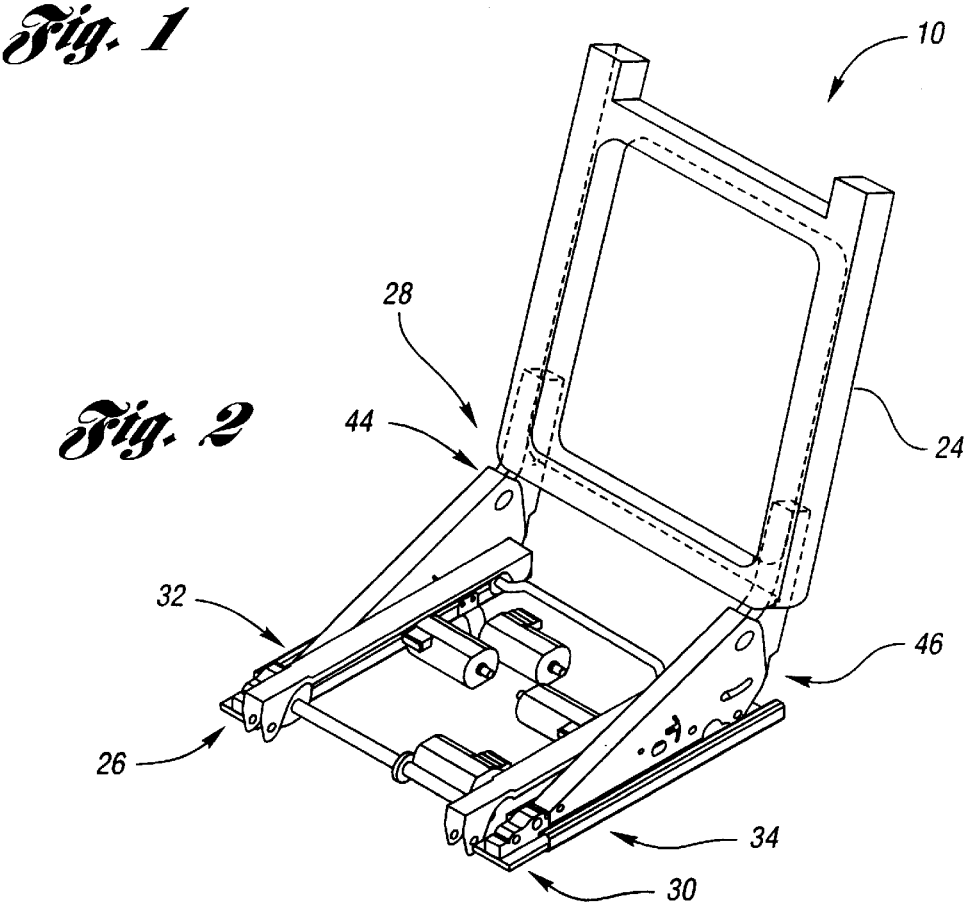
FIG. 2 is a perspective view of the driver seat with the upholstery, padding and headrest of the seat removed to show a seatback frame, pivot arrangement and lower seat structure.
Figure 3:
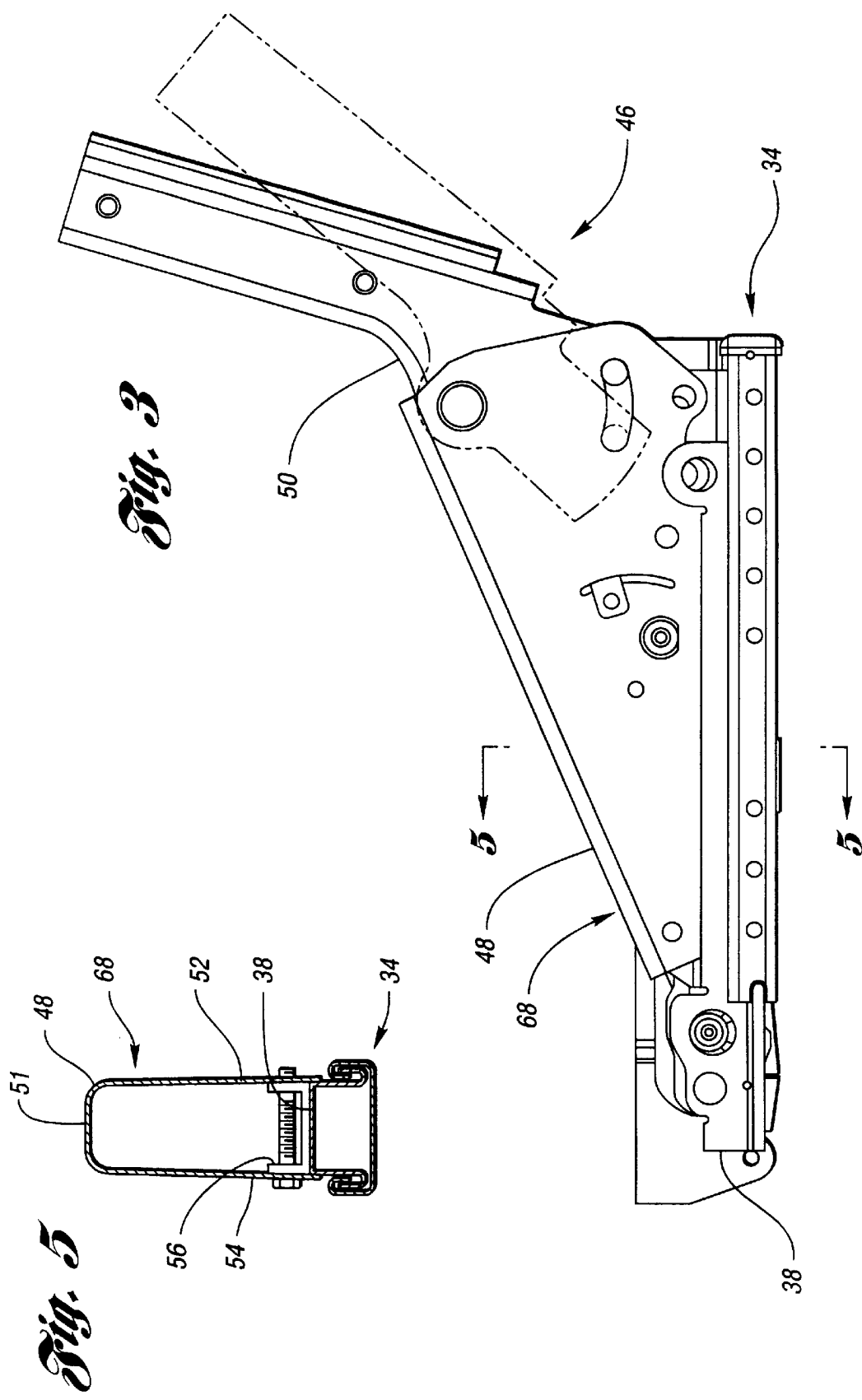
FIG. 3 is a side view of the pivot arrangement and lower seat structure.
Figure 4:
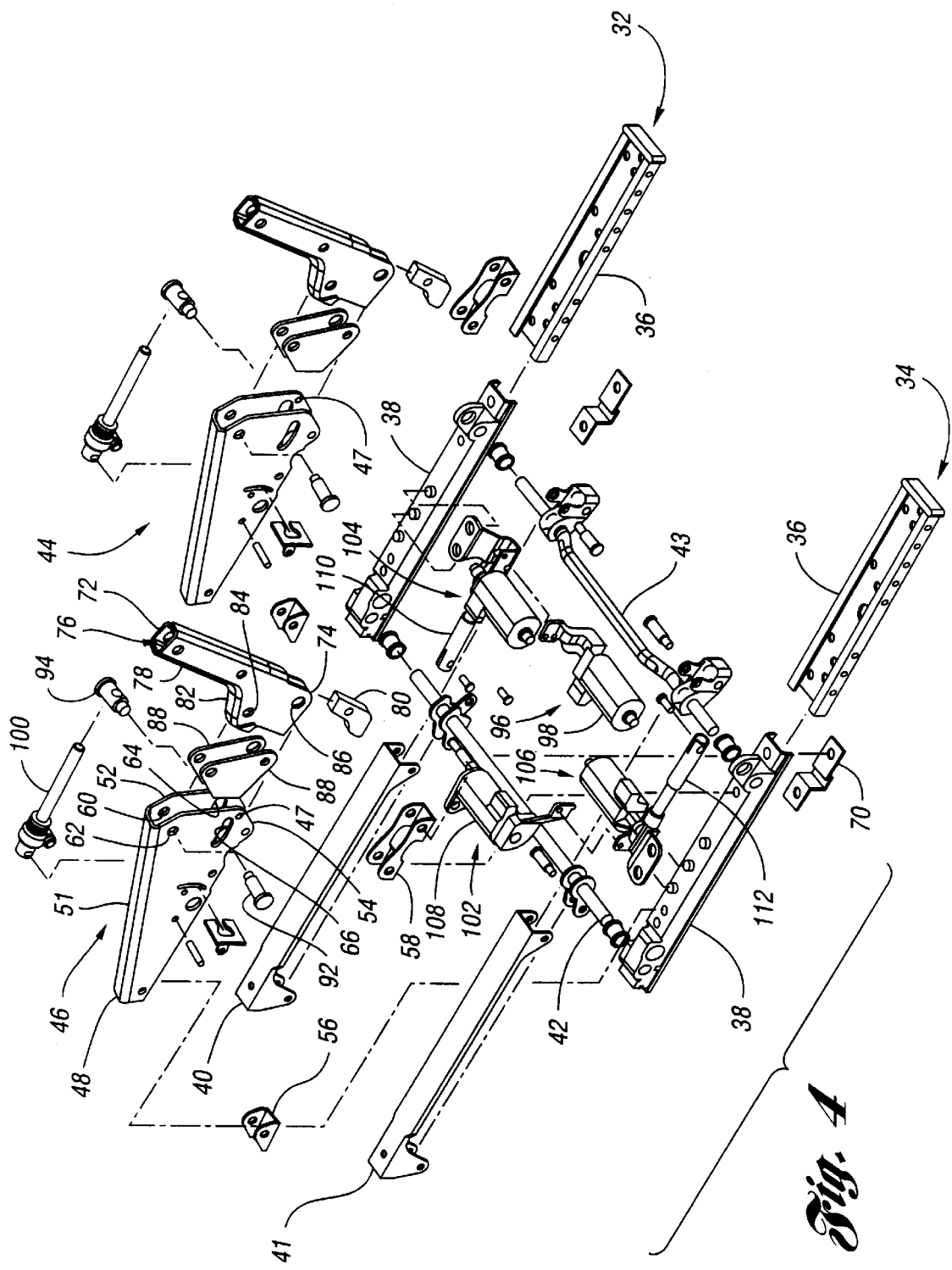
FIG. 4 is an exploded perspective view of the pivot arrangement and lower seat structure.

With reference to FIGS. 2 through 4, seat 10 is shown with its upholstery, padding, headrest 16 and safety belt system 18 removed to more clearly illustrate the novel structure and operational features of the invention. The seat 10 is shown generally to include a seatback frame 24, a lower seat structure 26, and a pivot arrangement 28 for pivotally connecting the seatback frame 24 to the lower seat structure 26. The seatback frame 24 provides support for the seatback 14, and also provides attachment points for the torso sections 19 and 20 of the safety belt system 18. The lower seat structure 26 includes a seat adjustment mechanism 30 that is adapted to permit a seat occupant to selectively adjust the longitudinal (i.e., fore and aft) position of the seat cushion 12 and seatback 14. Seat adjustment mechanism 30 includes a first or inboard track assembly 32, and second or outboard track assembly 34. Each of the track assemblies 32 and 34 includes a first or lower track 36 mounted to the floor of the vehicle, and a second or upper track 38 slidably attached to the lower track 36. The lower seat structure 26 further includes first and second pan brackets 40 and 41, respectively, for supporting the seat cushion 12. The pan brackets 40 and 41 are connected to the upper tracks 38 of the track assemblies 32 and 34 via front and rear torsion tube and linkage assemblies 42 and 43, respectively.

The pivot arrangement 28 includes a first or inboard pivot assembly 44, and a second or outboard pivot assembly 46, and the pivot assemblies 44 and 46 provide attachment points 47 for the lap sections 21 and 22 of the safety belt system 18. Alternatively, the lap portions 21 and 22 may be connected to other suitable components of the seat 10 such as the track assemblies 32 and 34. It is to be understood that inboard pivot assembly 44 and outboard pivot assembly 46 are identical in construction and function. Thus, while this detailed description will focus primarily on the construction and operation of the outboard pivot assembly 46, a thorough understanding of the inboard pivot assembly 44 will be apparent therefrom.

As shown in FIGS. 3 through 5, the outboard pivot assembly 46 includes a bracket 48 connected to the upper track 38 of the track assembly 34, and a connector member or pivot arm 50 connected to the seatback frame 24 and pivotally connected to the bracket 48. The pivot arm 50 is rotatable between a standard operating position, shown in solid lines in FIG. 3, and a reclined position, shown in phantom lines in FIG. 3.

As shown in FIGS. 4 and 5, the bracket 48 has an open bottom for receiving the upper track 38 of the track assembly 34, a top portion 51, and first and second substantially parallel side portions 52 and 54, respectively, which are attached to the upper track 38 of the track assembly 34. While the side portions 52 and 54 may be attached to the upper track 38 of the track assembly 34 in any suitable manner, in a preferred embodiment the side portions 52 and 54 are attached to the upper track 38 using two brackets 56 and 58 and suitable fasteners such as bolts or rivets. Preferably, the side portions 52 and 54 are also configured to interferingly engage opposite sides of the upper track 38 of the track assembly 34. Furthermore, the first and second side portions 52 and 54, respectively, have first and second openings 60 and 62, respectively, and first and second guide slots 64 and 66, respectively. The bracket 48 is preferably formed as a single piece of extruded high-strength steel.

Alternatively, the bracket 48 may comprise any suitable material having sufficient strength, and it may be formed in any suitable manner, such as by casting or forging.

Returning to FIG. 3, the bracket 48 cooperates with the upper track 38 of the track assembly 34 to define a support structure 68 for supporting loads applied to the pivot assembly 46. The support structure 68 preferably has a generally rectangular-shaped or box-shaped vertical cross-section, as shown in FIG. 5, along the length of the bracket 48, and the rectangular cross-section is defined by the top portion 51 and side portions 52 and 54 of the bracket 48, and the upper track 38 of the track assembly 34. Such a configuration provides significantly improved strength compared with prior seat assemblies having "all belts to seat" safety belt systems. Furthermore, the support structure 68 effectively distributes loads over the lower track 36 of the track assembly 34, which, in turn, transmits loads to the floor of the vehicle. To provide additional rigidity to the upper track 38 of the track assembly 34, and, consequently, to the support structure 68, a support bracket 70 is preferably mounted to the underside of the upper track 38 as shown in FIG. 4.

Still referring to FIG. 4, the pivot arm 50 comprises first and second generally boot-shaped members 72 and 74, respectively, that are joined together in any suitable manner such as by welding and/or by an interference fit. The members 72 and 74 define a cavity or channel 76, and an upwardly extending portion 78 that is adapted to be connected to the seatback frame 24 using threaded bolts or other suitable fasteners. An insert 80 is preferably disposed in the channel 76 for strengthening the pivot arm 50, and the insert 80 may be secured within the channel using one or more of the fasteners that connect the upwardly extending portion 78 to the seatback frame 24. Alternatively, the insert 80 may be secured within the channel in any suitable manner, such as with other fasteners and/or by an interference fit with the members 72 and 74. While the insert 80 may be formed of any suitable material and in any suitable manner, in a preferred embodiment the insert 80 is formed of cast aluminum.

The members 72 and 74 further define a heel portion 82 having a first aperture 84 that defines a pivot axis about which the pivot arm 50 may be selectively pivoted or rotated, and a second aperture 86 that is alignable with the guide slots 64 and 66 of the bracket 48. A pair of washers 88 are preferably used to space the pivot arm 50 away from the bracket 48. A pivot pin 92 extends through the first aperture 84, the washers 88, and the openings 60 and 62 of the bracket 48 for pivotally connecting the pivot arm 50 to the bracket 48. A threaded drive member or nut 94 extends through the second aperture 86, the washers 88, and the guide slots 64 and 66 of the bracket 48. While the members 72 and 74 of the pivot arm 50 may be formed of any suitable material and in any suitable manner, in a preferred embodiment the members 72 and 74 are formed of extruded high-strength steel. Alternatively, the pivot arm 50 may be formed as a single piece.

The seat 10 further includes a first drive arrangement 96 for selectively pivoting the pivot arm 50 relative to the bracket 48, to thereby pivot the seatback 14 relative to the seat cushion 12. The first drive arrangement 96 includes a first motor 98 connected to a leadscrew 100 by a flexible drive shaft (not shown), and the leadscrew 100 is rotatably connected to the drive nut 94. Rotation of the leadscrew 100 in one of two opposite directions causes the drive nut 94 to pivot the pivot arm 50 about its pivot axis toward the pivot arm reclined position, shown in phantom lines in FIG. 3. Rotation of the leadscrew 100 in the other direction causes the drive nut 94 to pivot the pivot arm 50 about its pivot axis toward the standard operating position, shown in solid lines in FIG. 3.

The seat 10 therefore provides a pivot arrangement 28 that may be automatically actuated to pivot the seatback 14 relative to the seat cushion 12. Advantageously, the pivot arrangement 28 is also configured to support belt-loads applied by a 3-point or 4-point safety belt system that is mounted to and carried by the seat 10, such that all belt-loads are carried by the seat 10 rather than a B-pillar of the vehicle.

Additionally, the seat 10 includes a second drive arrangement 102 for controlling fore and aft movement of the upper tracks 38 relative to the lower tracks 36 of the track assemblies 32 and 34, a third drive arrangement 104 for controlling vertical movement of a front portion of the seat cushion 12, and a fourth drive arrangement 106 for controlling vertical movement of a rear portion of the seat cushion 12. The second drive arrangement 102 includes a second motor 108 connected by flexible drive shafts (not shown) to leadscrews (not shown) disposed within the upper tracks 38. The third drive arrangement 104 includes a drive unit 110 connected to the front torsion tube and linkage assembly 42. The fourth drive arrangement 106 includes a drive unit 112 connected to the rear torsion tube and linkage assembly 43.

Figure 7:
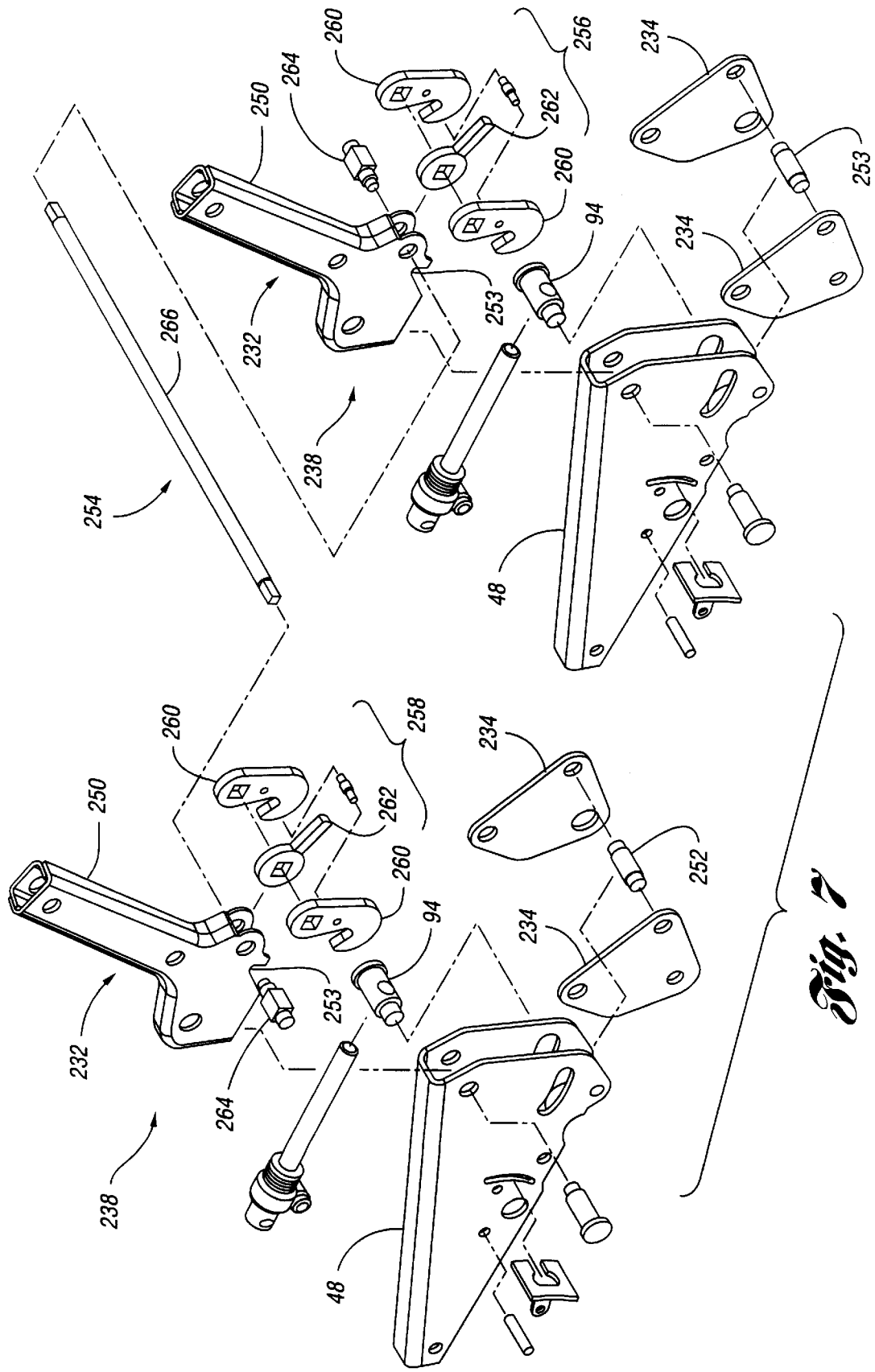
FIG. 7 is an exploded perspective view of the pivot arrangement shown in FIG. 6.

FIGS. 6 and 7 show a second embodiment 210 of the seat, which includes a pivot arrangement 228 as well as all of the other components of the seat assembly 10. The pivot arrangement 228 includes first and second pivot assemblies 230 and 232, respectively, and each of the pivot assemblies 230 and 232 includes a a connector member or pivot arm 250, a pair of plates or washers 234, and the bracket 48 of the pivot arrangement 28. Each of the pivot arms 250 has a notch 253 that is engageable with a respective drive nut 94. The washers 234 space a respective pivot arm 250 away from a respective bracket 48, and the washers 234 are joined together by a rivet or pin 252.

The pivot arrangement 228 further includes a release or dump mechanism 254 for enabling the pivot arms 250 to be manually pivoted with respect to the brackets 48. The dump mechanism 254 includes first and second hook assemblies 256 and 258, respectively, disposed in each of the pivot arms 250, and each of the hook assemblies 256 and 258 includes a pair of hooks 260 and a hook lever 262 that are connected together and to a respective pivot arm 250 by a preferably square-shaped pin 264. With this configuration, the hooks 260 are releasably engageable with a respective pin 252. The dump mechanism 254 further includes a linking member or cross tube 266 for linking the hook assemblies 256 and 258 together.

The seat 210 functions in a manner similar to the seat 10, except that the drive nuts 94 in the seat 210 also cause the hook assemblies 256 and 258 to rotate along with the pivot arms 250. Movement of the drive nuts 94 causes the washers 234 and the pins 252 to rotate, which in turn causes the hook assemblies 256 and 258 to rotate. Advantageously, when one or both of the hook levers 262 is rotated upwardly, the hooks 260 of the hook assemblies 256 and 258 are released from the pins 252 such that the pivot arms 250 and seatback 14 may be manually pivoted forwardly.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat for use in a vehicle having a floor, the vehicle seat comprising:
    a safety belt system mounted to and carried by the vehicle seat such that all loads applied to the safety belt system are supported by the seat;
    a lower seat structure adapted to be mounted to the floor;
    a seatback frame; and
    a pivot assembly connecting the seatback frame to the lower seat structure such that the seatback frame may pivot with respect to the lower seat structure, the pivot assembly including a bracket connected to the lower seat structure, and a pivotable connector member connected to the seatback frame and pivotally connected to the bracket, wherein the bracket has first and second substantially parallel side portions that define an open bottom therebetween, the first and second side portions being connected to the lower seat structure.

2. The vehicle seat of claim 1 wherein the connector member has a channel, and the pivot assembly further comprises an insert disposed in the channel for strengthening the connector member.

3. The vehicle seat of claim 1 wherein a portion of the safety belt system is mounted to the pivot assembly.

4. The vehicle seat of claim 1 further comprising a drive arrangement for automatically pivoting the connector member with respect to the bracket.

5. The vehicle seat of claim 4 further comprising a release mechanism for releasing the connector member from the drive arrangement so that the connector member may be manually pivoted with respect to the bracket.

6. The vehicle seat of claim 1 wherein the bracket has a generally U-shaped cross-section.

7. The vehicle seat of claim 1 wherein the bracket and the lower seat structure cooperate to define a support structure having a generally box-shaped vertical cross-section along a major portion of the length of the support structure.

8. The vehicle seat of claim 1 wherein the lower seat structure comprises a track assembly having a lower track adapted to be mounted to the floor and an upper track slidably attached to the lower track, and wherein the side portions of the bracket are attached to the upper track.

9. A vehicle seat for use in a vehicle having a floor, the vehicle seat comprising:
    first and second track assemblies, the first track assembly having a first lower track adapted to be connected to the floor and a first upper track slidably connected to the first lower track, the second track assembly having a second lower track adapted to be connected to the floor and a second upper track slidably connected to the second lower track;
    a seat back;
    a pivot arrangement connecting the seat back to the track assemblies such that the seat back may pivot with respect to the track assemblies, the pivot arrangement including first and second brackets connected to the first and second upper tracks, respectively, and first and second arms connected to the seat back and pivotally connected to the first and second brackets, respectively; and
    a safety belt system mounted to the vehicle seat such that all loads applied to the safety belt system are supported by the vehicle seat;
    wherein the first and second brackets cooperate with the first and second upper tracks, respectively, to form first and second support structures, respectively, having first and second generally rectangular-shaped vertical cross-sections, respectively.

10. A vehicle seat and vehicle combination comprising:

a vehicle having a floor;

first and second track assemblies, the first track assembly having a first lower track connected to the floor and a first upper track slidably connected to the first lower track, the second track assembly having a second lower track connected to the floor and a second upper track slidably connected to the second lower track;

a seat back;

a pivot arrangement connecting the seat back to the track assemblies such that the seat back may pivot with respect to the track assemblies, the pivot arrangement including first and second brackets connected to the first and second upper tracks, respectively, and first and second arms connected to the seat back and pivotally connected to the first and second brackets, respectively; and a safety belt system mounted to the vehicle seat such that all loads applied to the safety belt system are supported by the vehicle seat;

wherein the first and second brackets cooperate with the first and second upper tracks, respectively, to form first and second support structures, respectively, having first and second generally rectangular-shaped vertical cross-sections, respectively.

* * * * *